United States Patent
Prabhakaran Nair et al.

(10) Patent No.: US 10,242,083 B2
(45) Date of Patent: Mar. 26, 2019

(54) PREVENTION OF CIRCULAR EVENT PUBLICATION IN PUBLISH/SUBSCRIBE MODEL USING PATH VECTOR

(71) Applicant: Open Text Corporation, Waterloo (CA)

(72) Inventors: Sreejith Prabhakaran Nair, Bangalore (IN); Swati Bhatia, Bangalore (IN); Sachin G. Totale, Pleasanton, CA (US)

(73) Assignee: Open Text Corporation, Waterloo (CA)

( * ) Notice: Subject to any disclaimer, the term of this patent is extended or adjusted under 35 U.S.C. 154(b) by 0 days.

(21) Appl. No.: 15/288,854

(22) Filed: Oct. 7, 2016

(65) Prior Publication Data

US 2017/0199923 A1    Jul. 13, 2017

Related U.S. Application Data

(63) Continuation of application No. 14/172,196, filed on Feb. 4, 2014, now Pat. No. 9,489,442.

(51) Int. Cl.
*G06F 17/30* (2006.01)

(52) U.S. Cl.
CPC .............................. *G06F 17/30575* (2013.01)

(58) Field of Classification Search
CPC ......... G06F 17/30578; G06F 17/30575; G06F 17/30174; G06F 17/30176; G06F 17/30144; G06F 17/30194; G06F 17/30864

See application file for complete search history.

(56) References Cited

U.S. PATENT DOCUMENTS

| | | | | |
|---|---|---|---|---|
| 6,122,639 | A * | 9/2000 | Babu | H04L 12/12 |
| 6,134,532 | A | 10/2000 | Lazarus | |
| 7,725,903 | B2 * | 5/2010 | Kamiya | G06F 9/542 455/418 |
| 8,407,184 | B2 * | 3/2013 | Prophete | G06F 17/30575 707/634 |
| 9,489,442 | B1 | 11/2016 | Nair et al. | |
| 2002/0194393 | A1 * | 12/2002 | Hrischuk | G06F 9/542 719/318 |
| 2005/0034107 | A1 | 2/2005 | Kendall | |
| 2007/0027996 | A1 * | 2/2007 | Stewart | H04L 67/34 709/230 |
| 2007/0094672 | A1 | 4/2007 | Hayton | |
| 2007/0179996 | A1 | 8/2007 | Azami | |
| 2007/0217420 | A1 * | 9/2007 | Raj | H04L 45/00 370/392 |
| 2007/0282914 | A1 * | 12/2007 | Sivapragasam | G06F 17/30578 |
| 2009/0144753 | A1 | 6/2009 | Morris | |

(Continued)

OTHER PUBLICATIONS

Albrightson et al., EIGRP-A FAst Routing Protocol Based o Distance Vector, 14 pages (Year: 1994).*

(Continued)

*Primary Examiner* — Noosha Arjomandi
(74) *Attorney, Agent, or Firm* — Sprinkle IP Law Group

(57) ABSTRACT

Techniques to prevent circular event publication are disclosed. In various embodiments, a change in an entity's own value is detected. A change event is published based at least in part on the detected change, including by associating with the change event an event path vector that includes an identifier associated with the entity.

20 Claims, 5 Drawing Sheets

(56) References Cited

U.S. PATENT DOCUMENTS

| | | | |
|---|---|---|---|
| 2011/0045845 A1* | 2/2011 | Balasaygun | G06F 9/543 |
| | | | 455/456.1 |
| 2012/0016986 A1* | 1/2012 | Jacquet | H04L 47/10 |
| | | | 709/224 |
| 2012/0259894 A1* | 10/2012 | Varley | G06F 17/30575 |
| | | | 707/795 |
| 2013/0054220 A1 | 2/2013 | Gupta | |
| 2014/0075383 A1 | 3/2014 | Zheng | |
| 2014/0278210 A1 | 9/2014 | Krauss | |
| 2014/0297516 A1 | 10/2014 | Brown | |
| 2014/0349270 A1 | 11/2014 | Kapoor | |
| 2015/0120651 A1* | 4/2015 | Rajbhandari | G06F 17/30575 |
| | | | 707/610 |
| 2015/0142740 A1* | 5/2015 | Behuria | G06F 17/30575 |
| | | | 707/634 |
| 2017/0104826 A1* | 4/2017 | Sait | G05B 19/41855 |

OTHER PUBLICATIONS

Office Action for U.S. Appl. No. 14/172,196, dated Oct. 26, 2015, 11 pgs.
Office Action for U.S. Appl. No. 14/172,196, dated Feb. 24, 2016, 12 pgs.
Office Action for U.S. Appl. No. 14/172,196, dated May 4, 2016, 11 pgs.

* cited by examiner

PREVENTION OF CIRCULAR EVENT PUBLICATION IN PUBLISH/SUBSCRIBE MODEL USING PATH VECTOR

CROSS REFERENCE TO OTHER APPLICATIONS

This application is a continuation of co-pending U.S. patent application Ser. No. 14/172,196, entitled PREVENTION OF CIRCULAR EVENT PUBLICATION IN PUBLISH/SUBSCRIBE MODEL USING PATH VECTOR filed Feb. 4, 2014 which is incorporated herein by reference for all purposes.

BACKGROUND OF THE INVENTION

A publish/subscribe model supports loosely coupled asynchronous communication between information producers and consumers. Typically, the producer and consumer need not necessarily know of the existence of each other. A system that uses a publish/subscribe model to facilitate asynchronous communication between entities typically includes one or more producers and several consumers.

In some cases, an information producer (e.g., publishes events) can be an information consumer (e.g., consumes events) as well. In such scenarios, a circular event publication issue might be seen.

For example, a component of an application user interface or other display page might be configured to publish a "change" event upon occurrence of an update to an attribute or other data value of the component. There may be other entities within that system—typically the consumer entities—that may be interested in these changes. For example, such consumer entities may have "subscribed" to the change event, so that they are notified whenever a value of the entity that they are interested in changes. A circular event publication may occur, for example, if the component that published the change event is also a consumer of the change event, or subscribes to another event published by another component directly or indirectly in response to the change event.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; a system; a computer program product embodied on a computer readable storage medium; and/or a processor, such as a processor configured to execute instructions stored on and/or provided by a memory coupled to the processor. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details.

An event path vector to prevent circular event publication in a publish/subscribe model is disclosed. In various embodiments, in at least certain prescribed circumstances an entity that changes (e.g., a value of and/or associated with the entity changes) includes an identifier associated with the entity in an "event path vector" or other data structure and/or payload of a change event published by the entity in response to the change. In some embodiments, an entity that consumes such an event first checks to determine if its own identifier is present already (and/or more than a prescribed number of times) in an event path vector associated with the event. If so, the entity may drop the event. If not, the entity may consume and respond normally to the event, e.g., by updating itself using an evaluation function implicated by the event.

Figure 1:
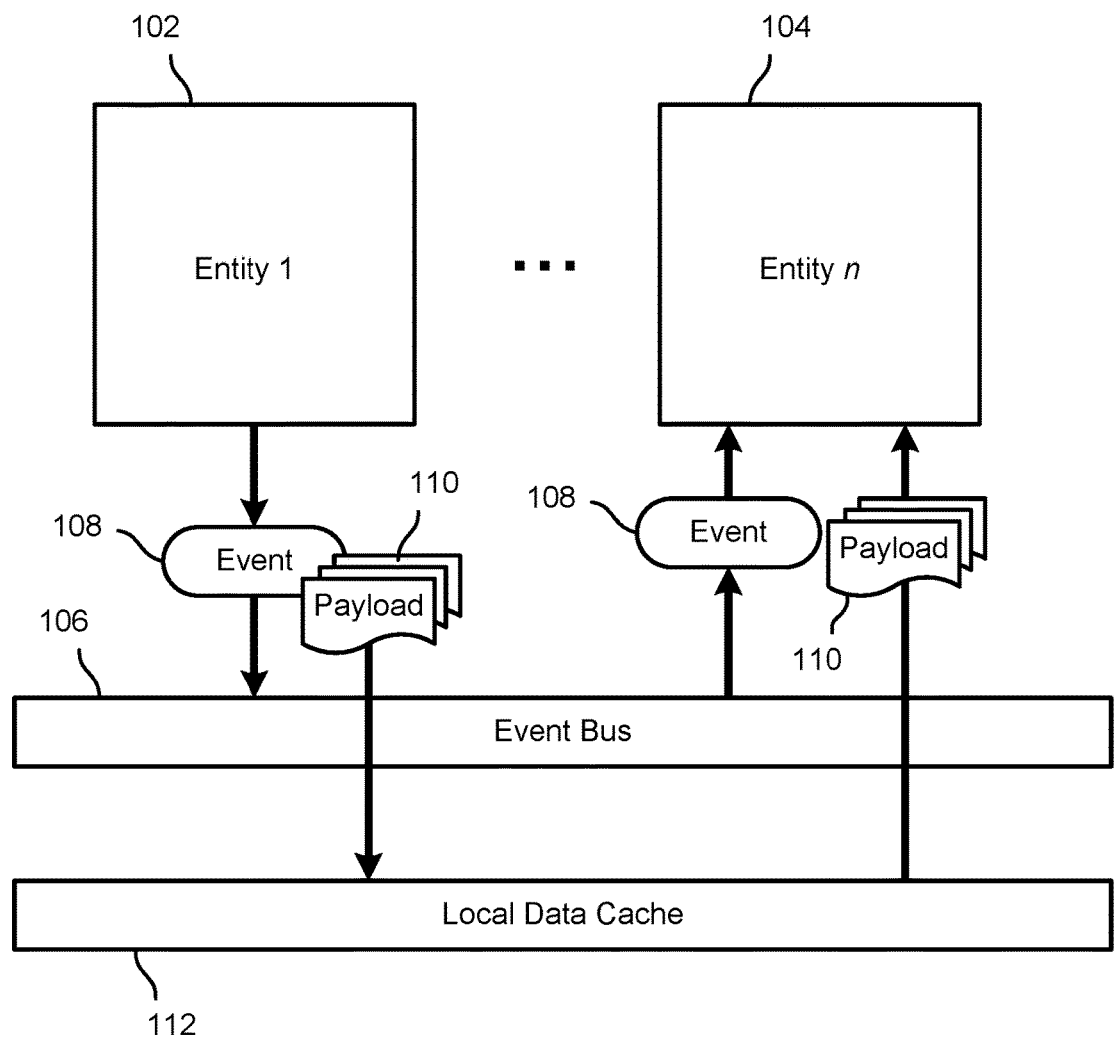
FIG. 1 is a block diagram illustrating an example embodiment of a system that employs a publish/subscribe model.

FIG. 1 is a block diagram illustrating an example embodiment of a system that employs a publish/subscribe model. In the example shown, the system includes a plurality of entities 1 to n, represented in FIG. 1 by entities 102 and 104. An "entity" may be any discrete unit that has one or more data values and is capable of providing information (e.g., to other entities), consuming information, or both. Examples of an "entity" include without limitation a software object; a software module; and a defined component of a display page. In various embodiments, each of one or more of the entities 1 to n, may be an information provider (e.g., publish events), an information consumer (e.g., subscribes to and consumes events), or both. Events published by information providers are provide via an event bus 106. In various embodiments, the event bus 106 may be a software bus and/or other structures and/or protocols to enable entities such as entities 102 and 104 to publish (send) and/or consume (receive) events. In the example shown, a value of (or associated with) entity 102 has changed, resulting in the entity 102 publishing a change event 108 having an associated event payload 110. In the example shown, the event payload is stored in and/or made available to event subscribers via a local data cache 112. The event 108 and associated payload 110 are consumed by entity 104 in the example shown. For example, the entity 104 may have subscribed to receive change events associated with entity 102. One example of an instance in which entity 104 may be configured to subscribe to receive change events associated with entity 102 is the case in which a value of entity 104 and/or a value associated therewith depends on a value of and/or associated with entity 102, e.g., based on an evaluation function.

An event path vector to prevent circular event publication is disclosed. In various embodiments, entities such as entity 102 and entity 104 of FIG. 1, and/or a service or other entity associated with such entities, is configured to include in and/or otherwise associate with an event published, for example, by one of the entities, such as a change event, an identifier associated with the entity that publishes the event. For example, in the example shown in FIG. 1, the entity 102 may include in the payload 110 an event path vector that includes an identifier associated with entity 102. In some embodiments, if the value of entity 102 changed in response to an event received via event bus 106 and the latter event already had an event path vector associated with it, then the entity 102 would add its identifier to the vector, e.g., by appending its identifier to the identifiers included previously in the vector, and would include the updated vector in the payload 110 of change event 108. In some embodiments, upon receiving the event 108, a consuming entity, such as entity 104 in the example shown in FIG. 1, would check the event payload to determine whether its own identifier is included already (or, in some embodiments, more than a prescribed number of times) an event path vector associated with the event. If so, the event is dropped; if not, the event is consumed and acted on.

Figure 2:
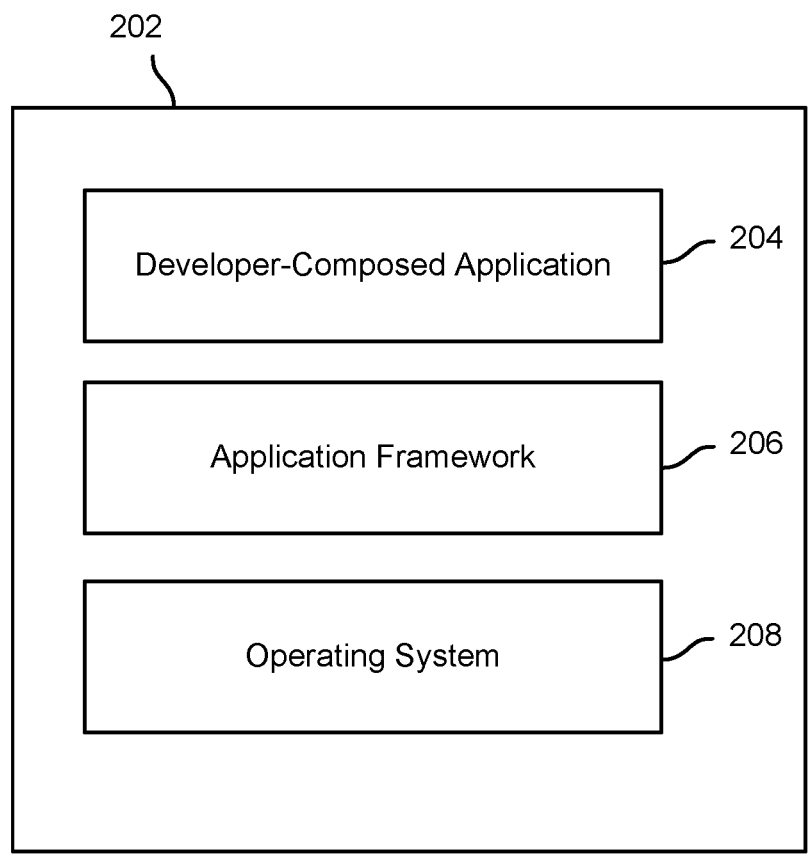
FIG. 2 is a block diagram illustrating an example embodiment of a system in which a publish/subscribe model, e.g., as shown in FIG. 1, may be implemented.

FIG. 2 is a block diagram illustrating an example embodiment of a system in which a publish/subscribe model, e.g., as shown in FIG. 1, may be implemented. In the example shown, the system 202 includes a developer-composed application 204 running on an application framework 206 provided using an operating system 208. Examples of a developer-composed application include, without limitation, applications developed using a developer tool, such as the EMC® Documentum® xCP solution development platform. In various embodiments, a developer tool enables a developer to create an application to run on application framework 206, including for example by creating one or more application user interface pages each comprising a plurality of page components, and specifying for each its behavior, variables (e.g., values), etc., and the relationship between such components. In various embodiments, the application framework 206 may enable communication between such page components via an event bus, such as event bus 106 of FIG. 1. For example, an evaluation function or other logic may be specified by the developer to cause application code to be generated such that a page component may publish a change event, e.g., like entity 102 of FIG. 1, upon occurrence of a change in its value and/or a value otherwise associated with the component. Likewise, a page component may be designed using the developer tool to consume, like entity 104 of FIG. 1, a change event associated with one or more other entities, such as entities on which a value of the subscribing component may depend, for example based on an evaluation function or other relationship specified by the developer to be used to determine a value for the subscribing component.

In various embodiments, the application framework 206 of FIG. 2 may be configured to implement a publish/subscribe model to facilitate asynchronous communication among/between entities. For example, the application framework 206 may be configured to provide an event bus, such as event bus 106 of FIG. 1, and/or a local data cache to facilitate storage and transfer of event payloads, such as local data cache 112 of FIG. 1. In some embodiments, the application framework 206 may be configured to ensure that an event path vector, as disclosed herein, is associated with a change event, and/or to ensure that one or more subscribing entities consume and/or act on change events only if an identifier associated with the subscribing entity does not already appear in an event path vector associated with the event (or, in some embodiments, does not occur more than a prescribed number of times). In some embodiments, application code generated to provide the entities themselves may create, populate, and/or check and respond to information found in event path vectors as disclosed herein.

In various embodiments, an event path vector is provided and/or used as disclosed herein in contexts other than applications composed using a developer tool and/or in contexts other than systems such as system 202 of FIG. 2.

Figure 3:
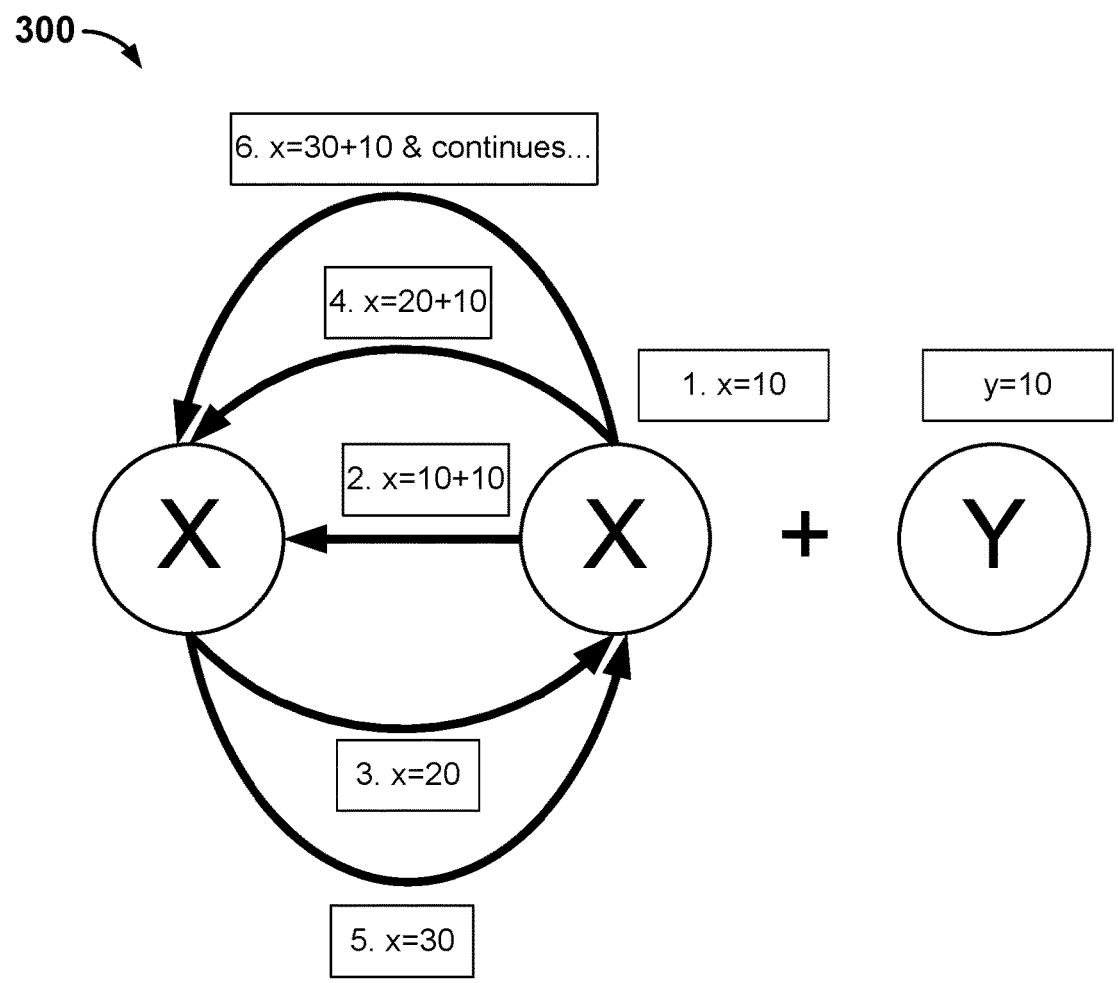
FIG. 3 is a block diagram illustrating an example of a circular event chain.

FIG. 3 is a block diagram illustrating an example of a circular event chain. A circular event chain may occur in architectures such as those shown in FIGS. 1 and 2 when an event path vector as disclosed herein is not used. In the example 300 shown in FIG. 3, the value of entity 'x' is determined by the evaluation function $x=x+y$. For example, in the case of an application user interface, a user may initially provide user input for the value of x, e.g., a characters entered by the user into a text field, and the evaluation function may be intended to append a period or other content to the text entered by the user. In the example shown, the value of 'x' first is changed to $x=10$ and 'y' initially has the same value, i.e., $y=10$, and in this example remains constant at that value. In response to the value of 'x' changing to $x=10$, a change event is published, triggering the evaluation function to be evaluated based on the new value of x, resulting in the value of 'x' being updated to $x=20$. The foregoing change in the value of 'x', to $x=20$, causes a further change event to be published, which results in the function being evaluated again, this time causing the value of 'x' to be updated to $x=20+10$. This in turn causes a further change event to be published ($x=30$), prompting a further iteration of evaluation of the function to be performed ($x=30+10$), and so on, ad infinitum.

An event path vector to avoid circular event publication, such as that shown in FIG. 3, is disclosed. For example, in various embodiments an event path vector would be provided with the event labeled "3" in FIG. 3 ($x=20$), and would include an identifier associated with the publishing entity 'x'. In various embodiments, on receipt of the event labeled "3" in FIG. 3, the entity 'x' (or some other service, process, or entity) would evaluate the event path vector, recognize that an identifier associated with 'x' is already included, and based on that determination would cause the entity 'x' to drop (i.e., not act on) the change event, thereby preventing the a circular event chain. For example, using the event path vector approach disclosed herein, the entity 'x' in the example shown in FIG. 3 would not act on the change event labeled "3" in FIG. 3 ($x=20$) and as a result would not further update the value of 'x' in successive iterations, thereby breaking what otherwise would have been the circular chain illustrated in FIG. 3.

Figure 4:
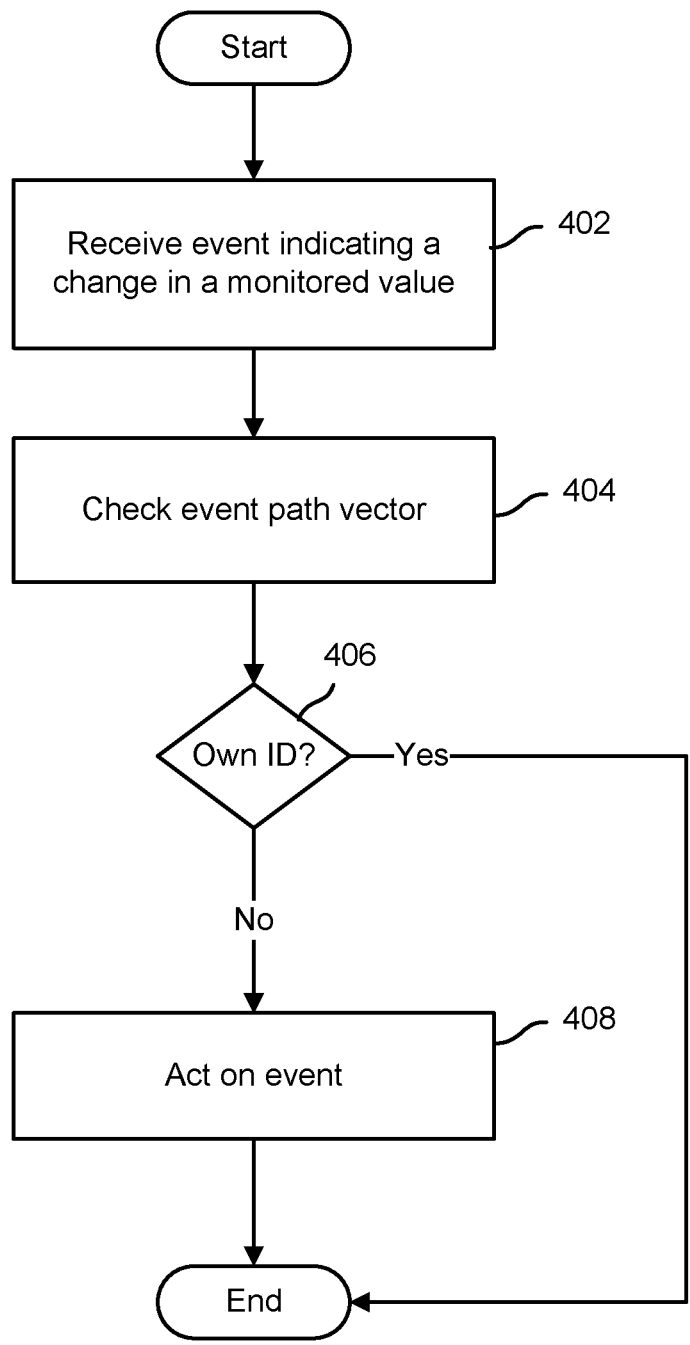
FIG. 4 is a flow chart illustrating an example embodiment of a process to consume a change event.

FIG. 4 is a flow chart illustrating an example embodiment of a process to consume a change event. The process of FIG. 4 may be implemented by an event consumer, such as entity 104 of FIG. 1 and/or a component of an application user interface page of a developer-composed application, such as application 204 of FIG. 2, and/or may be facilitated in whole or in part by an application framework such as application framework 206 of FIG. 2. The process of FIG. 4 is an example of the use by an event consumer of an event path vector as disclosed herein to avoid circular event publication, such as the circular publication shown in FIG. 3. In the example shown in FIG. 4, an indication is received, e.g., at an entity, that a monitored value has changed (402). For example, a change event published by another entity and which the receiving entity has subscribed to receive may be received. An event path vector associated with the event is checked (404) to determine whether the receiving entity's own identifier is included already (or, in some embodiments, more than a prescribed number of times) in the event path vector. If the receiving entity's own identifier is determined to be included already (or, in some embodiments, more than a prescribed number of times) in the event path vector (406), the event is dropped without being acting on further by the receiving entity. If not (406), the receiving entity acts on the event (408), for example by evaluating a function to update its own value based on the event and/or an associated payload.

Figure 5:
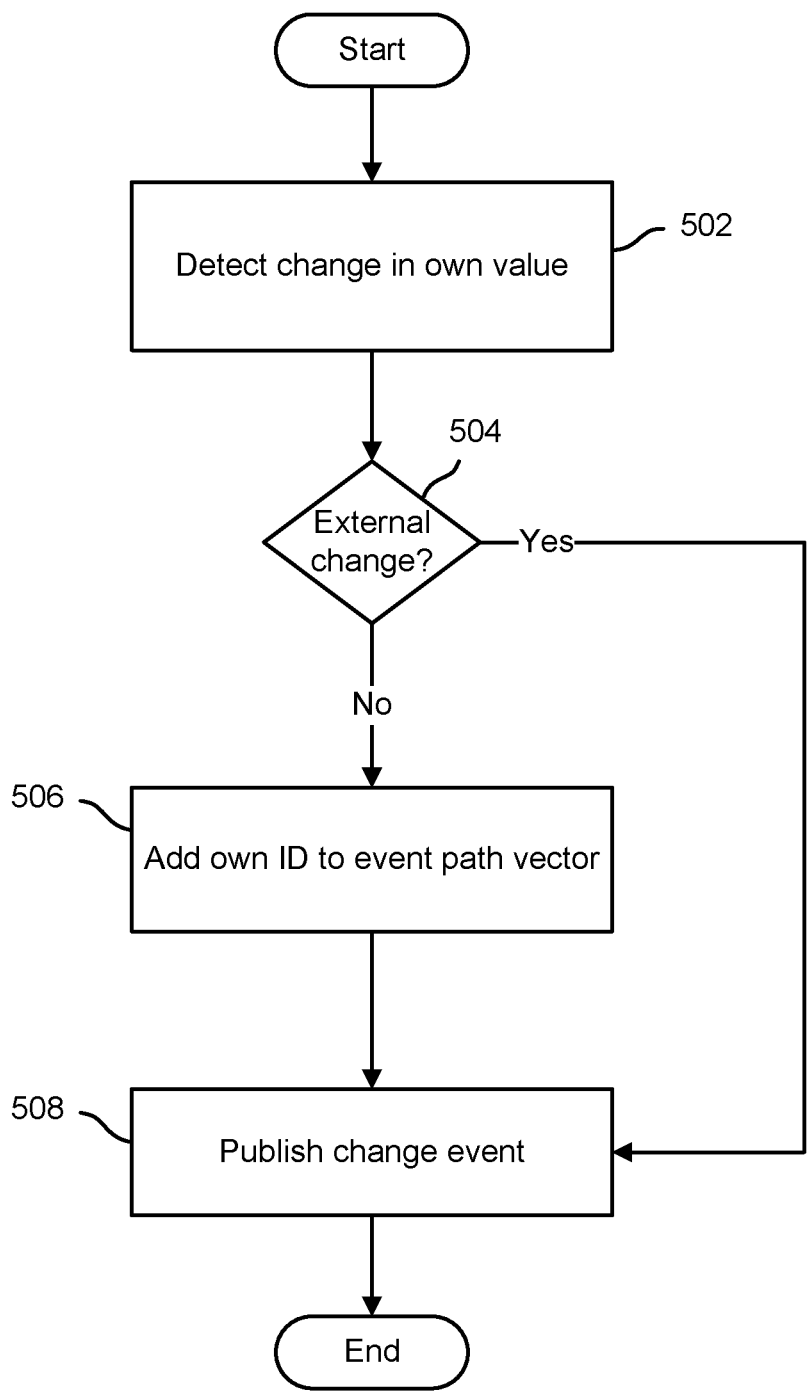
FIG. 5 is a flow chart illustrating an example embodiment of a process to publish a change event.

FIG. 5 is a flow chart illustrating an example embodiment of a process to publish a change event. The process of FIG. 5 may be implemented by an event publisher, such as entity 102 of FIG. 1 and/or a component of an application user interface page of a developer-composed application, such as application 204 of FIG. 2, and/or may be facilitated in whole or in part by an application framework such as application framework 206 of FIG. 2. The process of FIG. 5 is an example of the use by an event publisher of an event path vector as disclosed herein to enable circular event publication, such as the circular publication shown in FIG. 3, to be avoided. In the example shown, a change in an entity's own value (and/or a value associated therewith) is detected (502). In various embodiments, an entity's value may be changed by or in response to a change event, e.g., a change event is received indicating a change in a value on which the value of the entity depends, such as an argument in an evaluation function associated with the entity, or externally, e.g., based on user input. For example, an application user interface or other page component may detect that an attribute, variable, or other data value of the component has changed. If the detected change is not from an external source, e.g., it is the result of a function being evaluated (504), the entity includes its own identifier in an event path vector associated with the detected change (506) and publishes a change event (508), including the event path vector in the payload (or otherwise). For example, if the detected change was made in response to a change event the entity received and an event path vector with one or more entries was included with that change event, in various embodiments the current entity will add its identifier to the preexisting event path vector (506). If no prior event path vector exists, in some embodiments the entity will create an instance of an event path vector and include its own identifier as an initial entry (506). In some embodiments, if the detected change in the entity's own value was from an external source, such as user input into an input field associated with an application user interface page component (504), the change event is published (508) without including the publishing component's identifier in an event path vector associated with the event.

In various embodiments, a system may use techniques disclosed herein and illustrated by and with reference to FIGS. 1 through 5 to prevent circular event chains as in the following example, in which:

x=f(y)+f(z)
z=f(a)+f(b)
b=f(x)+f(c)
'c' is changed by a user, e.g., user input

In this example, each of the entities 'x', 'z', 'b', and 'c' performs the process of FIG. 4 with respect to consuming change events, e.g., with respect to events indicating a change in a dependent value on which a value of the entity depends, and performs the process of FIG. 5 with respect to publishing change events, e.g., to inform other entities of detected changes in its own value. In various embodiments, the subsequent processing, using techniques disclosed herein, would be as follows:

1. 'c' sends the information that it has changed with no source payload. In this example, 'c' does not include a source payload, specifically an event path vector, because the change in c's value came from an external source, i.e., user input, and not from an event received from itself or another entity via an event bus (see, e.g., FIG. 5, steps 502, 504, and 508).
2. 'b' consumes the change event published by 'c' and checks the path vector for its own ID. Since, 'b' is not part of a path vector included in the change event published by 'c', 'b' re-evaluates itself (see, e.g., FIG. 4, steps 402, 404, 406, and 408).
3. 'b' sends the information that it has changed with source payload—['b'] (see, e.g., FIG. 5, steps 502, 504, 506, and 508).
4. 'z' consumes the information sent by 'b' and checks the path vector for its own ID. Since, 'z' is not part of the path vector it re-evaluates itself (see, e.g., FIG. 4, steps 402, 404, 406, and 408).
5. 'z' sends the information that it has changed with source payload—['b', 'z'] (see, e.g., FIG. 5, steps 502, 504, 506, and 508).
6. 'x' consumes the information sent by 'z' and checks the path vector for its own ID. Since, 'x' is not part of the path vector it re-evaluates itself (see, e.g., FIG. 4, steps 402, 404, 406, and 408).
7. 'x' sends the information that it has changed with source payload—['b', 'z', 'x'] (see, e.g., FIG. 5, steps 502, 504, 506, and 508).
8. 'b' consumes the information sent by 'x' and checks the path vector for its own ID. Since, 'b' is part of the event path vector as sent by 'x', 'b' drops the information (see, e.g., FIG. 4, steps 402, 404, 406, and "end").

Use of event path vectors as disclosed herein may prevent circular event publication in systems in which a publish/subscribe model is used.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   receiving, at an entity, an event including an indication that a change event has occurred and an event path vector associated with the change event, the change event indicating a change in value;
   in response to receiving the indication, checking the event path vector associated with the change event for an identifier identifying the entity; and
   after the checking, selecting and performing, by a computing device, processing according to a first mode of operation or a second mode of operation based on whether the identifier identifying the entity is included in the event path vector, the processing according to the first mode of operation including dropping the change event by the entity, the dropping the change event being performed based on the checking determining that the identifier identifying the entity is included in the event path vector as received and the processing according to the second mode of operation including updating the event path vector by adding the identifier identifying the entity to a set of one or more identifiers included in the event path vector as received and associating the change event with the updated event path vector, the updating the event path vector being performed based on the checking determining that the identifier identifying the entity is not included in the event path vector as received, wherein a presence of the identifier identifying the entity in the event path vector indicates that the entity was previously modified by an event chain, and an absence of the identifier identifying the entity in the event path vector indicates that the entity was not previously modified by the event chain, wherein the entity is a software component adapted to provide information to or consume information from at least one other software component.

2. The method of claim 1, wherein the change is associated with evaluation of a function used to determine a value for the entity.

3. The method of claim 2, wherein the function is evaluated in response to the received event.

4. The method of claim 3, wherein the received event indicates a change in another entity's value.

5. The method of claim 4, wherein the other entity's value is an argument of the function.

6. The method of claim 4, wherein the change in the other entity's value is received via the received event.

7. The method of claim 1, wherein the indication that the change event has occurred includes a published change event, wherein the entity is a subscribing entity configured to receive the published change event.

8. The method of claim 1, wherein the entity is configured to act on the change event based at least in part on a determination that the identifier identifying the entity is not included in the event path vector.

9. The method of claim 1, wherein the entity is configured to act on the change event based at least in part on a determination that the identifier identifying the entity is not included in the event path vector more than a prescribed number of times.

10. The method of claim 1, wherein the entity is adapted to both provide information to and consume information from the at least one other software component.

11. A system comprising:
at least one device processor; and
at least one memory storing instructions translatable by the at least one device processor to:
receive, at an entity, an event including indication that a change event has occurred and an event path vector associated with the change event, the change event indicating a change in value;
in response to receiving the indication, check the event path vector associated with the change event for an identifier identifying the entity;
drop the change event by the entity based on the checking determining that the identifier identifying the entity is included in the event path vector; and
update the event path vector by adding the identifier identifying the entity to the event path vector as received and associate the change event with the updated event path vector based on the checking determining that the identifier identifying the entity is not included in the event path vector, wherein a presence of the identifier identifying the entity in the event path vector indicates that the entity was previously modified by an event chain, and an absence of the identifier identifying the entity in the event path vector indicates that the entity was not previously modified by the event chain, wherein the entity is a software component adapted to provide information to or consume information from at least one other software component.

12. The system of claim 11, wherein the change is associated with evaluation of an evaluation function used to determine a value for the entity.

13. The system of claim 12, wherein the at least one device processor is configured to evaluate the evaluation function in response to the received event.

14. The system of claim 13, wherein the received event indicates a change in another entity's value.

15. The system of claim 14, wherein the other entity's value is an argument of the evaluation function.

16. The system of claim 11, wherein the entity is adapted to both provide information to and consume information from the at least one other software component.

17. A computer program product to prevent circular event publication, the computer program product being embodied in a non-transitory computer readable storage medium and comprising computer instructions for:
receiving, at an entity, an event comprising an indication that a change event has occurred and an event path vector associated with the change event, the change event indicating a change in value;
in response to receiving the indication, checking the event path vector associated with the change event for an identifier identifying the entity;
drop the change event by the entity based on the checking determining that the identifier identifying the entity is included in the event path vector; and
update the event path vector by adding the identifier identifying the entity to the event path vector as received and associate the change event with the updated event path vector based on the checking determining that the identifier identifying the entity is not included in the event path vector, wherein a presence of the identifier identifying the entity in the event path vector indicates that the entity was previously modified by an event chain, and an absence of the identifier identifying the entity in the event path vector indicates that the entity was not previously modified by the event chain, wherein the entity is a software component adapted to provide information to or consume information from at least one other software component.

18. The computer program product of claim 17, wherein the change is associated with evaluation of an evaluation function used to determine a value for the entity.

19. The computer program product of claim 18, wherein the change is detected by an application user interface or other page component.

20. The computer program product of claim 17, wherein the entity is adapted to both provide information to and consume information from the at least one other software component.

* * * * *